(12) United States Patent
Heilprin et al.

(10) Patent No.: US 10,289,790 B2
(45) Date of Patent: May 14, 2019

(54) SYSTEM, METHOD AND COMPUTER PRODUCT FOR ENHANCED DECOUPLING CAPACITOR IMPLEMENTATION

(71) Applicant: NUVOTON TECHNOLOGY CORPORATION, Hsinchu Science Park (TW)

(72) Inventors: Aryeh Heilprin, Tel-Aviv (IL); Rafael Eliezer Diaz, Caesarea (IL); Arnon Sharlin, Herut (IL)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 52 days.

(21) Appl. No.: 15/622,625

(22) Filed: Jun. 14, 2017

(65) Prior Publication Data
US 2018/0365363 A1    Dec. 20, 2018

(51) Int. Cl.
| G06F 17/50 | (2006.01) |
| H01L 27/00 | (2006.01) |
| H01L 27/02 | (2006.01) |

(52) U.S. Cl.
CPC ...... *G06F 17/5072* (2013.01); *G06F 17/5081* (2013.01); *H01L 27/0207* (2013.01); *G06F 17/5031* (2013.01); *G06F 17/5068* (2013.01); *G06F 2217/06* (2013.01); *G06F 2217/84* (2013.01)

(58) Field of Classification Search
None
See application file for complete search history.

(56) References Cited

U.S. PATENT DOCUMENTS

| 6,323,050 | B1 | 11/2001 | Dansky et al. |
| 6,487,702 | B2* | 11/2002 | Lin ............. G06F 1/26 716/119 |
| 6,618,847 | B1* | 9/2003 | Hulse .......... G06F 17/5036 716/115 |
| 6,763,509 | B2 | 7/2004 | Korobkov |
| 6,898,769 | B2 | 5/2005 | Nassif et al. |
| 7,222,320 | B2 | 5/2007 | Ogawa |
| 7,245,516 | B2 | 7/2007 | Inoue |
| 8,015,522 | B2* | 9/2011 | Wang ........... G06F 17/5045 716/107 |
| 8,224,601 | B2 | 7/2012 | Okumura |

(Continued)

OTHER PUBLICATIONS

C.-Y. Yeh et al., Timing-aware power noise reduction in layout, 2005 IEEE/ACM Int'l Conference on Computer-Aided Design, pp. 626-633. (Year: 2005).*

(Continued)

*Primary Examiner* — Leigh M Garbowski
(74) *Attorney, Agent, or Firm* — Oliff PLC

(57) ABSTRACT

A method for designing an integrated circuit die, the method including generating a first layout for the die which includes at least one decap; and performing a post-processing decap insertion operation to add at least one additional decap in excess of the at least one decap, the operation including: for at least a portion of the first layout, identifying at least some of whichever locations in at least the portion have positive slack, as "candidate" locations; and inserting at least one additional decap at at least one respective location from among the "candidate" locations.

23 Claims, 2 Drawing Sheets

---

0. Provide a putative or initial or starting Die/Chip Floorplan
↓
1. Implement a given design netlist into a complete layout block meeting all timing requirements. During this stage, decaps may be implemented
↓
2. Within the given layout, identify at least one, some or all Filler locations available for placing capacitors e.g. dcaps and store their coordinates.
↓
3. For at least one e.g. each filler location, if there are no net segments in Metal-1 crossing the Filler, perform a Filler to Dcap swap
↓
4. For at least one of e.g. each of the Filler locations which have Metal-1 routing over the Filler hence were not replaced in operation 3 above, record the timing condition of nets routed in Metal-1 over the area occupied by the Filler cell
↓
5. Prioritize filler locations for upcoming swap operation such as but not limited to timing-driven prioritization
↓
6. Start replacing Fillers "hosting" Metal-1 nets with capacitors e.g. decaps, in any suitable order e.g. as per time-driven or other prioritization which may be provided by performing operation 5
↓
7. Typically, terminate operation 6 when a predetermined stopping condition is found to have become true.
↓
8. The Implementation phase may be completed by suitable quality Control operations configured to ensure timing and DCR closure before design release to production, e.g. as per some/all of the operations of Fig. 2.

(56) References Cited

U.S. PATENT DOCUMENTS

| | | | |
|---|---|---|---|
| 8,421,205 B2 | 4/2013 | Yang | |
| 8,479,136 B2 | 7/2013 | Hopkins et al. | |
| 9,262,572 B2 | 2/2016 | Ganesan et al. | |
| 9,465,899 B2* | 10/2016 | Sundareswaran | G06F 17/5072 |
| 2003/0212973 A1* | 11/2003 | Lin | G06F 17/5036 |
| | | | 716/113 |
| 2007/0061769 A1 | 3/2007 | Kumagai | |
| 2013/0088275 A1* | 4/2013 | Fennell | G06F 17/5031 |
| | | | 327/292 |
| 2014/0167815 A1 | 6/2014 | Penzes | |
| 2015/0186586 A1 | 7/2015 | Pillai et al. | |
| 2016/0117431 A1 | 4/2016 | Kim et al. | |
| 2017/0364625 A1* | 12/2017 | Schwarz | G06F 17/5072 |

OTHER PUBLICATIONS

S. Pant et al., "Timing-Aware Decoupling Capacitance Allocation in Power Distribution Networks," 2007 Asia and South Pacific Design Automation Conference, pp. 757-762. (Year: 2007).*

P.-Y. Chen et al., "Transition-Aware Decoupling-Capacitor Allocation in Power Noise Reduction," 2008 IEEE/ACM Int'l Conference on CAD, 4 pages. (Year: 2008).*

T. Enami et al., "Decoupling Capacitance Allocation for Timing with Statistical Noise Model and Timing Analysis," 2008 IEEE/ACM Int'l Conference on Computer-Aided Design, 6 pages. (Year: 2008).*

H.-T. Chen et al., "New Spare Cell Design for IR Drop Minimization in Engineering Change Order," 2009 ACM Design Automation Conference, pp. 402-407. (Year: 2009).*

Y. Tao et al., "Decoupling Capacitor Planning With Analytical Delay Model on RLC Power Grid," 2009 EDAA, 6 pages. (Year: 2009).*

Stringfellow et al.; "Decoupling Capacitance Estimation, Implementation, and Verification: A Practical Approach for Deep Submicron SoCs;" SNUG; 2007; pp. 1-57.

Dey et al.; "Smart Decap Insertion Methodology;" Design and Reuse; 2017; http://www.design-reuse.com/articles/31663/smart-decap-insertion-methodology.html, 5 pages.

* cited by examiner

Fig. 1

0. Provide a putative or initial or starting Die/Chip Floorplan
   ↓
1. Implement a given design netlist into a complete layout block meeting all timing requirements. During this stage, decaps may be implemented
   ↓
2. Within the given layout, identify at least one, some or all Filler locations available for placing capacitors e.g. dcaps and store their coordinates.
   ↓
3. For at least one e.g. each filler location, if there are no net segments in Metal-1 crossing the Filler, perform a Filler to Dcap swap
   ↓
4. For at least one of e.g. each of the Filler locations which have Metal-1 routing over the Filler hence were not replaced in operation 3 above, record the timing condition of nets routed in Metal-1 over the area occupied by the Filler cell
   ↓
5. Prioritize filler locations for upcoming swap operation such as but not limited to timing-driven prioritization
   ↓
6. Start replacing Fillers "hosting" Metal-1 nets with capacitors e.g. decaps, in any suitable order e.g. as per time-driven or other prioritization which may be provided by performing operation 5
   ↓
7. Typically, terminate operation 6 when a predetermined stopping condition is found to have become true.
   ↓
8. The Implementation phase may be completed by suitable quality Control operations configured to ensure timing and DCR closure before design release to production, e.g. as per some/all of the operations of Fig. 2.

FIG. 2

Quality Control operation 8a. Timing of the subject logic is verified e.g. Via a timing query which may cross several logic structures.

Quality Control operation 8b. Any remaining timing violations are corrected. For example, even if a delta>0 slack-margin timing criterion is used, the timing of the corresponding net may get more timing propagation than expected, resulting in a timing violation which is then fixed (e.g. As per operation 8c below), until chip timing requirements have been met.

Quality Control operation 8c. Fix other Design-Rule (DRC) violations, if any, such as but not limited to transition margin violation, capacitance margin violations, using conventional implementation practices such as but not limited to buffering and/or std-cell resizing to meet timing degradations.

SYSTEM, METHOD AND COMPUTER PRODUCT FOR ENHANCED DECOUPLING CAPACITOR IMPLEMENTATION

REFERENCE TO CO-PENDING APPLICATIONS

No priority is claimed.

FIELD OF THIS DISCLOSURE

The present invention relates generally to chip design and more particularly to electronic design automation.

BACKGROUND FOR THIS DISCLOSURE

Chip designs are sensitive to noise since there is a risk that potential noise generators, such as but not limited to the power grid which provides Vdd and ground signals, will exceed whichever noise-margins were built into the design. On-chip decoupling capacitors (decaps) attached to a power mesh to decrease noise effects are known. Adding decaps is efficient in noise reduction as they provide charge localization. dcaps may be added to areas or regions of an integrated circuit that otherwise have no cells or to "high-risk" areas such as high speed memories.

Placement of decoupling capacitors e.g. for Very Large Scale Integrated Chips (VLSI), is known. Conventional technologies therefor are described inter alia in the following patents: U.S. Pat. Nos. 6,323,050, 6,763,509, 6,898,769, 7,222,320, 7,245,516, 8,421,205, 8,479,136, 9,262,572, 9,465,899, and published patent applications US20070061769A1, US20140167815A1, US20150186586A1 and US20160117431A1.

U.S. Pat. No. 8,224,601 describes decap estimation generally and methods to determine how many decap cells are needed to address a power noise violation created locally in the design.

Another conventional decap (aka dcap) placement process is described in the following public domain document available on Internet: "Decoupling Capacitance Estimation, Implementation, and Verification: A Practical Approach for Deep Submicron SoCs" by David Stringfellow and John Pedicone at Synopsys.com. The document characterizes dynamic variations in supply voltage as a problem which impacts chip performance hence constitutes "a major issue" for DSM SoC design teams. To achieve an acceptable level of voltage fluctuation in the power supply network, a sufficient amount of decoupling capacitance is allocated. Then the resulting decoupling capacitors can act as local charge reservoirs for high-frequency circuits, reducing the effects of power-supply noise on neighboring circuits. The document describes how DCAP estimation and Implementation Flow is used in state of the art VLSI devices.

A state-of-the-art 'placed and routed' design methodology is described in "Smart Decap Insertion Methodology" by Amit Dey, Vikas Garg, Rahul Saxena, Shailesh Kumar, available on the web at the following www location: design-reuse.com/articles/31663/smart-decap-insertion-methodology.html. Dey et al describe that "[i]n a 'placed and routed' design where decaps and fillers are already inserted, to increase the decap value we have to exchange already inserted fillers into decaps. To enable this m1 and via1 layer have to rerouted which can create potential shorts and spacing violation with m1 of decap when decap is inserted. To reroute the m1 and via1 routes, routing blockages of m1 and via1 layer are added . . . . But before this we remove all the decaps and fillers from the design. After adding the routing blockages there will be numerous shorts and spacing violation between m1 and via1 layers and the routing blockages. To resolve these shorts the routes creating the violation are eco routed, which causes the routes to reposition between the routing blockage . . . . Then the routing blockages are deleted. Now the decaps can easily be inserted without any drc violation, as the m1 layer in decap are occupied in the region of previously added routing blockages. By this technique we get 10-20% improvement in decap value."

Conventional Place and Route Tools perform Dcap Insertion inter alia. Examples of such software tools include: Synopsys ICC and ICC2, Synopsys Apollo, Cadence Encounter platform, Mentor Graphics—Nitro-SoC, Mentor Graphics—Olympus-SoC and Ansys—Apache RedHawk. At least some of the conventional Place and Route tools mentioned above perform timing-aware aka timing driven placement of std-cells.

Conventional custom TCL scripts able to perform Filler to Dcap swaps have been developed by IBM, Intel, Marvel, QCOM, BroadCom inter alia.

The disclosures of all publications and patent documents mentioned in the specification, and of the publications and patent documents cited therein directly or indirectly, are hereby incorporated by reference. Materiality of such publications and patent documents to patentability is not conceded.

SUMMARY OF CERTAIN EMBODIMENTS

Certain embodiments of the present invention seek to optimize design and fabrication of integrated circuits e.g. ASICs (application-specific integrated circuits).

Certain embodiments of the present invention seek to provide a method for implementing or placing decaps, with enhanced ability to control IC development process flow and/or to assess design quality. Certain embodiments of the present invention seek to provide an improved method for implementing or placing decaps by swapping filler cells, including providing an initial chip design including filler cells then swapping at least one of the filler calls with decaps.

Certain embodiments of the present invention seek to provide a capacitor-insertion method which even, if performed as a post-process operation, in which capacitors are additionally implemented after a full or complete layout is ready, capacitor e.g. dcap insertion proceeds with no impact on die area and little or no impact on timing, even in a very crowded IC design, where routing resources are very limited. This may be advantageous e.g. in increasing the rate of decaps in a given layout and/or shortening the implementation cycle and/or not compromising other design constraints such as Timing, Chip/Die Area and Power requirements.

Certain embodiments of the present invention seek to reduce the silicon area or die size required for a given chip with given objectives, by relaxing or reducing constraints conventionally imposed on route congestion to facilitate a desired level of decap swapping, which conventionally requires a low level of route congestion.

Certain embodiments of the present invention seek to provide a smart filler-to-decap swapping process which may allow die size to be reduced, for a given desired decap density, by 5% or 10% or more.

Certain embodiments herein seek to provide timing-driven insertion of dcaps. Certain embodiments of the present invention seek to provide a software method to configure and drive a Place-and Route (P&R) tool to implement Decoupling Capacitor Implementation optimization for given Logic.

Certain embodiments of the present invention seek to provide a method for designing an integrated circuit (e.g. ASIC) die which includes a decap insertion operation including identifying, for at least a portion of a first layout for the die, at least some of whichever filler locations in at least said portion have Metal-1 cross signals (e.g. signals crossing the filler location's physical area with Metal-1 segment route) all having positive timing slack, as "candidate" locations; and replacing at least one such "candidate" locations with a decap.

It is appreciated that for many Filler and decap cells, signal routes cross the physical area occupied by the celland these signals have net segments of Metal-1 up to the top-most metal layer used for routing.

Certain embodiments of the present invention seek to provide a method for identifying filler cells and replacing at least some identified filler cells with capacitor cells e.g. decaps, including generating timing slack evaluations of metal-1 nets that cross these filler cells, and using these evaluations as a consideration for whether or not to replace fillers with capacitors (decaps). Capacitor cells are connected using Metal-1 and typically, DCAP cells uses the Metal-1 layer, internally, to connect all their internal active devices to form the Capacitor. Nonetheless, conventional methods typically do not swap these filler cells with decap cells to avoid Design-Rule Violations (DRCs) or if such swaps are effected a need to signal re-route to overcome DRC generated violations typically results, thereby prolonging timing closure cycles and/or enlarging die-size, and/or creating design difficulties within high utilization route areas.

It is appreciated that a net segment Metal-1 that crosses filler cells generally has potential to generate a Design Rule Violation (DRC) if the metal-1 crossed filler cell is replaced with the Decap cell. This DRC violation (Interference) is a net short and requires a Metal-1 segment reroute. Metal-1 route resources are typically highly utilized by the decap cell, hence a net-re-route is typically required to overcome this short. DRC identifies net shorts, Net Transition, and Net Capacitance. To overcome these "culprits", the affected segments are typically re-routed at a higher metal level (e.g. Metal2/Meta3/Metal4/Metal5/Metaln); note demand for routing resources may be scarce in the affected area.

Certain embodiments of the present invention seek to provide a method which performs a Filler to Decap cell swap in at least one location suffering from a Design Rule (DRC) violation aka Metal-1 Short.

Certain embodiments of the present invention seek to provide an improved method which adds decaps without wasting chip area resources by swapping filler cells with decaps.

The following terms may be construed either in accordance with any definition thereof appearing in the prior art literature or in accordance with the specification, or as follows:

Cell routing is intended to include Metal-route of the std-cell pins e.g. in the schema of the design. Example: consider a schema of Cell1 pin Z that needs to connect to Cell2 pin A. The Cell-Routing is the metal route between these two cells pins, implemented in Metal layers anywhere from Metal-1 (lowest metal layer) to Metal-n (highest).

Cell-routing change is intended to include any Metal-topology change in the route implementation.

Decoupling capacitor aka DCAP aka decap: is intended to include two-terminal capacitor cells which are typically interspersed between standard logic cells and which are hooked to a power supply on one of the two terminals and to a respective ground on the other of the decap cell's two terminals.

Critical nets, Critical Signals, critical cells: intended to include nets/signals/cells in a chip under design, whose timing, termed "critical timing', is very tight or on-the-edge in the sense of being positive-slack yet being close to flipping to negative-slack aka "breaking", with ensuing decreased chip/die performance, in the event of additional, even small, physical route changes. Any increase in physical properties e.g. resistivity/capacitance on these signals/nets may enlarge the delay associated therewith.

Closing design, Timing Design Closure: a portion of the integrated circuit design development workflow (which may include e.g. static timing analysis, placement, routing, logic synthesis) which facilitates generation of an integrated circuit's final design by ensuring the design meets constraints and objectives.

Filler cells: intended to include cells inserted after placement of standard cells using automated p & r, in order to fill in gaps between standard-cells thereby ensuring abutment by obviating gaps; it is appreciated that the resulting abutment allows, for example, "thin cells" which lack Bulk Connection (Substrate connection) due to their small size, to use the Bulk connection of other cells. Small cells' substrates may connect to Power/Ground nets by virtue of cells abutted thereto. The term "filler cell" is intended to include any physical cell, typically characterized by an x-y dimension (size) and an x-y location, which is generated in an is design process but has no designated logical function and instead fills in gaps between previously defined cells ("standard cells") which do respectively have designated logical functions.

Filler cells are typically intended to include cells which fill in spaces between standard cells. Typically, to ensure each cells gets power and ground connection, cells are abutted together e.g. so VDD and VSS terminal of neighboring cells short together hence power can be tapped only at one point anywhere in the row. Hence, if as is almost invariably the case, standard cells that have been placed using an automatic p & r tool fill less than 100% of the die area, filler cells are inserted into the gaps between the standard cells after placement of the latter until a situation has been reached in which all cells have "neighbors" (each cell abuts other cells on each side), without gaps. Filler cells may comprise non-functional cells used to continue the VDD and VSS rails e.g. since discontinuity in power, ground and diffusion layers occurs if cells are not abutting. Filler cells typically reduce the DRC Violations created by the base (e.g. NWell, PPlus & NPlus) layers and/or help maintain Power Rail connection continuity. The term "origin" is used by some p & r tools to refer to x, y coordinates of a filler cell.

Filler location: intended to include a location of or for a filler cell.

Layout block: intended to include a section of a chip's floorplan. e.g. only the standard-cell physical area, or only a portion of the floorplan of the entire chip.

Logic-Cell aka standard-cell is intended to include Buffer, AND-gate, NOR-gate, Flip-Flop inter alia.

Net aka network is intended to include a set or collection of interconnected circuit components. A netlist may be used to describe the connectivity of the circuit and may include a list of the components and of the nodes to which they are respectively connected. A layout may be generated by using a router (cell-based or gate array router) for "routing the net". A net is intended to include a single wire connecting pin X to pin Y whereas a connectivity network is intended to include all the pin connectivity in an entire chip.

Random Logic is intended to include a set of logic-gates (aka standard cells) implementing a Boolean function.

Slack, positive slack: a characteristic of a signal/net. intended to include "Slack" associated with a given connection, in static timing analysis (STA). intended to include the difference between required time and the arrival time, where arrival time of a signal is the time elapsed (due to delay engendered by all the components in the path) until a signal arrives at a certain point or node, relative to a reference time 0, typically taken as the arrival time of a clock signal. And the required time is the latest time at which a signal can arrive without making the clock cycle longer than desired. Thus positive slack s at some node implies that the arrival time at that node may be increased by s, without increasing the overall delay of the circuit. negative slack implies a path is too slow and must be sped up (or the reference signal must be delayed).

Positive slack s at node N is typically intended to include a situation in which the arrival time relative to what may be deemed a required-time is positive (above zero or at least a predetermined threshold amount above zero), and thus if one increases route-delay, and arrival time is further delayed, delay time may still be met, as opposed to situations in which the arrival time relative to what may be deemed required-time is negative. Typically, positive slack allows a dcap to be inserted without timing impact and therefore, a location or node with positive slack is a candidate location for dcap insertion and conversely, typically, negative slack does not allow a dcap to be inserted because such insertion would have a timing impact and therefore, a location or node with negative slack is typically not a candidate location for dcap insertion. Also, typically, the more positive the slack, the more suitable that location's candidacy (as a dcap insertion location) is considered to be. "Positive" typically does not imply that the endpoint is at zero; instead the lower endpoint of the "positive slack" range may be predefined above zero.

Swap: is intended to include removing a filler cell and placing or inserting a (typically same-sized) dcap cell in its stead.

Timing-Driven, aka Timing-Aware: intended to characterize certain physical operation/stages in certain Place and Route (P&R) methods in which Logic cells that have tight timing relationships are identified e.g. so the P&R tool can place these cells as close as possible to each other, rather than using long interconnect wires which tend to increase delay. Typically, routing Timing-Driven signals identifies critical timing relationships within a set of all wires to be wired and increases their routing priority so as to wire these locations first, to ensure direct point-to-point with reduced wire length. Thus delay is optimized and minimized on short length nets.

The present invention typically includes at least the following embodiments:

Embodiment 1

A method for designing an integrated circuit die, the method including:

generating a first layout for the die which includes at least one decap; and performing a post-processing decap insertion operation to add at least one additional decap in excess of the at least one decap, the operation including:

for at least a portion of the first layout, identifying at least some of whichever locations in at least the portion have positive slack, as "candidate" locations; and inserting at least one additional decap at at least one respective location from among the "candidate" locations.

Embodiment 2

A method according to any of the preceding embodiments wherein the first layout for the die meets all timing requirements defined for the die.

Embodiment 3

A method according to any of the preceding embodiments wherein the at least a portion comprises the entire first layout.

Embodiment 4

A method according to any of the preceding embodiments wherein within at least a portion of the die, the inserting occurs repeatedly, in descending order of slack.

Embodiment 5

A method according to any of the preceding embodiments wherein within the entire die, the inserting occurs repeatedly, in descending order of slack.

Embodiment 6

A method according to any of the preceding embodiments wherein the first layout includes at least one filler location and wherein the identifying comprises identifying at least some of whichever filler locations in at least a portion of a first layout for the die have METAL-1 signal crosses.

Embodiment 7

A method according to any of the preceding embodiments wherein all filler locations in at least the portion whose nets have positive slack, are identified as "candidate" locations.

Embodiment 8

A method according to any of the preceding embodiments wherein within at least a portion of the die, the inserting occurs repeatedly until the following stop-criterion is reached: the sum of capacitances of all inserted dcaps has reached a predetermined total capacitance.

The predetermined total capacitance may for example be a percentage of the total capacitance already reached in the 1st layout. Also, it is possible to have a different total capacitance for each of various regions in the die. Typically, the contribution of each dcap cell to the total capacitance is a percentage of the total dcap requirement.

Embodiment 9

A method according to any of the preceding embodiments wherein at least one filler location is checked to determine whether or not there is metal-1 routing over the filler location and at least one filler location in which there is no metal-1 routing over the filler location is replaced by a decap.

Embodiment 10

A method according to any of the preceding embodiments wherein all filler locations are checked to determine whether or not there is metal-1 routing over the filler location.

Embodiment 11

A method according to any of the preceding embodiments wherein a necessary condition for replacing an individual filler location with a decap is that there is no metal-1 routing over the individual filler location.

Embodiment 12

A method according to any of the preceding embodiments which identifies Metal-1 net segments with positive timing, forces at least one Filler-to-Decap swap that causes a DRC/Net Short and re-routes at least one Metal-1 net that is shorting to alleviate the signal shorts in a metal scheme higher than metal-1.

Embodiment 13

A method according to any of the preceding embodiments wherein the first layout includes at least one filler location and wherein the identifying comprises identifying at least some of whichever filler locations have nets with positive slack, as "candidate" locations.

Embodiment 14

A method according to any of the preceding embodiments wherein the identifying comprises identifying, for at least the portion of the first layout for the die, only filler locations in at least the portion have Metal-1 cross signals with positive timing slack, as "candidate" locations; and replacing at least one of the "candidate" locations with at least one respective decap.

Embodiment 15

A system for designing an integrated circuit die, the system including:
At least one processor configured for generating a first layout for the die which includes at least one decap; and for performing a post-processing decap insertion operation to add at least one additional decap in excess of the at least one decap, the operation including:
  for at least a portion of the first layout, identifying at least some of whichever locations in at least the portion have positive slack, as "candidate" locations; and
  inserting at least one additional decap at at least one respective location from among the "candidate" locations.

Embodiment 16

A computer program product, comprising a non-transitory tangible computer readable medium having computer readable program code embodied therein, the computer readable program code adapted to be executed to implement a method designing an integrated circuit die, the method including:
  generating a first layout for the die which includes at least one decap; and
  performing a post-processing decap insertion operation to add at least one additional decap in excess of the at least one decap, the operation including:
    for at least a portion of the first layout, identifying at least some of whichever locations in at least the portion have positive slack, as "candidate" locations; and
    inserting at least one additional decap at at least one respective location from among the "candidate" locations.

Also provided, excluding signals, is a computer program comprising computer program code means for performing any of the methods shown and described herein when said program is run on at least one computer; and a computer program product, comprising a typically non-transitory computer-usable or -readable medium e.g. non-transitory computer-usable or -readable storage medium, typically tangible, having a computer readable program code embodied therein, the computer readable program code adapted to be executed to implement any or all of the methods shown and described herein. The operations in accordance with the teachings herein may be performed by at least one computer specially constructed for the desired purposes or general purpose computer specially configured for the desired purpose by at least one computer program stored in a typically non-transitory computer readable storage medium. The term "non-transitory" is used herein to exclude transitory, propagating signals or waves, but to otherwise include any volatile or non-volatile computer memory technology suitable to the application.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein.

The embodiments referred to above, and other embodiments, are described in detail in the next section.

Any trademark occurring in the text or drawings is the property of its owner and occurs herein merely to explain or illustrate one example of how an embodiment of the invention may be implemented.

The term "computer" should be broadly construed to cover any kind of electronic device with data processing capabilities, including, by way of non-limiting example, personal computers, servers, embedded cores, computing system, communication devices, processors (e.g. digital signal processor (DSP), microcontrollers, field programmable gate array (FPGA), application specific integrated circuit (ASIC), etc.) and other electronic computing devices.

Elements separately listed herein need not be distinct components and alternatively may be the same structure. A statement that an element or feature may exist is intended to include (a) embodiments in which the element or feature exists; (b) embodiments in which the element or feature does not exist; and (c) embodiments in which the element or feature exist selectably e.g. a user may configure or select whether the element or feature does or does not exist.

Any suitable computerized data storage e.g. computer memory may be used to store information received by or generated by the systems shown and described herein.

BRIEF DESCRIPTION OF THE DRAWINGS

FIG. 1 is a simplified flow illustration of a dcap insertion method constructed and operative in accordance with an embodiment of the invention. Some or all of the illustrated operations may be provided.

FIG. 2 is a simplified flow illustration of a method constructed and operative in accordance with an embodiment of the invention for Implementation phase completion including quality Control operations configured to ensure timing and DCR closure before design release to production, all or some of which may be performed.

Methods and systems included in the scope of the present invention may include some (e.g. any suitable subset) or all of the functional blocks shown in the specifically illustrated implementations by way of example, in any suitable order e.g. as shown.

Computational, functional or logical components described and illustrated herein can be implemented in various forms, for example, as hardware circuits such as but not limited to custom VLSI circuits or gate arrays or programmable hardware devices such as but not limited to FPGAs, or as software program code stored on at least one tangible or intangible computer readable medium and executable by at least one processor, or any suitable combination thereof.

Firmware implementing functionality described herein, if provided, may be held in any suitable memory device and a suitable processing unit (aka processor) may be configured for executing firmware code. Alternatively, certain embodiments described herein may be implemented partly or exclusively in hardware in which case some or all of the variables, parameters, and computations described herein may be in hardware.

Any logical functionality described herein may be implemented as a real time application if and as appropriate and which may employ any suitable architectural option such as but not limited to FPGA, ASIC or DSP or any suitable combination thereof.

Any hardware component mentioned herein may in fact include either one or more hardware devices e.g. chips, which may be co-located or remote from one another.

DETAILED DESCRIPTION OF CERTAIN EMBODIMENTS

IC dies containing large areas populated with random logic, made of huge collection of standard logic cells, are very complex to route (routing refers to the connectivity between these standard logic cells). Underlying programs/algorithms which are basic for all VLSI chip implementation today such as Place and Route technologies are used to effect the die's Physical Implementation. Conventional Place and Route algorithms prioritize placement and route based on timing graphs that standard-cells carry with them throughout the VLSI chip implementation process. Major EDA (electronic design automation) companies such as Synopsys ICC, Cadence Encounter, and Mentor P&R sell IC design programs for implementation of chips' physical design, thereby to arrive at a physical implementation (layout arrangement) of an IC chip.

Practical constraints include Timing, Area, Design for Manufacturing (DFM), and power consumption. For example, some designs are subject to a size aka area constraint which is deemed necessary due to product marketing considerations. Some designs must achieve high-speed if performance goals are to be met e.g. a strong PC that must do trillions of calculations per second. Chips in mobile devices may be subject to power constraints since end-users are loath to charge the battery too frequently. These constraints differ between different ICs. IC designs that are greatly constrained in area result in very dense zones of standard cells, where density is intended to include the "utilization rate" at which the given area is practically occupied by standard cells (the proportion of the area occupied by the standard cells).

Generally, the set or collection of areas, in an IC die zone populated with standard cells, which remain available for placing the connectivity network, is referred to as the die's "routing resources". These physical area resources, scarce in ICs which are greatly constrained in area, can be utilized by routing tools to place wires connecting between the logic cells. Unfortunately, dense IC designs with limited routing resources often require many rounds of iteration to complete routing or implement fixes via incremental routing, commonly known as ECO, while simultaneously meeting all predefined criteria, e.g. timing constraints: too often, incremental routing change, implemented when the utilization rate is very high and few routing resources are available, are followed by non-optimal re-routing of nets affected by the change, which in turn negatively affects logic timing, which results in timing violations and consequent need for further fixes.

Yet another IC design requirement is power integrity. To satisfy this, the implementation flow e.g. in deep-submicron IC technologies includes adding DCAP or decap cells, typically small, within areas populated with standard logic cells. These two-terminal capacitors are hooked to the relevant power supply on one terminal and to the respective ground on the other terminal. Such capacitors may be shaped to fit within and may be routed like standard logic cells. Conventional decap insertion technologies are described e.g. in the references listed in the Background section above) and may be implemented by conventional IC design tools. For example, the Synopsys ICC tool has a command to spread DCAP cells in the design which is termed "insert_std_filler-metal-cell {List of references}".

In a typical implementation flow, a "final" optimization of this placement of capacitors e.g. dcaps either takes place after, or is interleaved with, optimization and closure of timing. This "final" optimization may include identifying available areas and populating them with capacitors. If zones lacking capacitors e.g. dcaps are identified, a major layout/floor plan change may have to be made to make room for additional capacitors e.g. dcaps. Major floor plan change may for example include:

Free space between any two standard-Cells is considered for DCAP insertion usage.

A reference DCAP cell size that meets the "free" distance between the two standard-Cells is identified.

Placement tool creates a Physical-Only reverence cell from the cell library

Placement algorithm "pulls" the newly created instance and embed the DCAP cell to "fill" the gap (free-space) between the two standard-cells Inserting a capacitor e.g. dcap in a certain location may also in many, or most cases, require a cell routing change to resolve Metal-1 DRC Shorts—e.g. in order to both accommodate and route appropriately. As described herein, changes in routing of dense IC regions typically generates new and undesirable timing issues whose subsequent resolution complicates the design cycle by prolonging its convergence.

A capacitor e.g. dcap placement method in accordance with certain embodiments of the present invention, is now described in detail with reference to FIG. 1. The method may for example be run standalone, or incorporated as a feature into a suitable program e.g. a suitable P&R (Place and Route) tool such as but not limited to Synposys-ICC or, mutatis mutandis, inside other tools mentioned herein or any other conventional P&R tool. The operations described below may each be provided or performed in isolation, or all operations may be provided or performed, or any subset thereof may be provided or performed, in any suitable order such as but not limited to that shown:

Operation 0. Provide a putative or initial or starting Die/Chip Floorplan using any suitable P&R tool providing Chip Floorplan creation functionality typically as a preliminary stage of the tool's Placemethod. Typically, the floorplan includes placed standard cells (aka std-cells), and all the interconnect already routed. Typically, a "gap" exists between a large number of std-cells. Often, almost all of the std-cells are not abutting to each other hence gaps exist between almost all standard cells.

Operation 1. Implement a given design netlist into a complete layout block meeting all timing requirements. During this stage, decaps may be implemented e.g. inserted per known methods e.g. The method of simply avoiding insertion and placement of dcap cells in a filler space that will cause a metal-1 short.

Operation 2. within the given layout, identify at least one, some or all filler locations available for placing capacitors e.g. Dcaps and store their coordinates. For example, a suitable tcl command may be used to query the p&r tool regarding at least one, some or all locations identified as filler spaces e.g. At least one, some or all gaps between std_cells that are not abutting to each other. For example, a query to identify these Filler cells may be implemented as a TCL command run at the P&R command prompt level. e.g.:
for each filler_type {FILL16BWP7THVT FILL32BWP7THVT FILL4BWP7THVT FILL64BWP7THVT FILL8BWP7THVT GFILL10BWP7THVT GFILL2BWP7THVT GFILL3BWP7THVT GFILL4BWP7THVT GFILLBWP7THVT FILL16BWP7T FILL32BWP7T FILL4BWP7T FILL64BWP7T FILL8BWP7T GFILL10BWP7T GFILL2BWP7T GFILL3BWP7T GFILL4BWP7T GFILLBWP7} {puts "processing fillers of type $filler_type" foreach_in_collection filler [get_cells-quiet-all*-filter "ref_name==$filler_type"]

Operation 3. For at least one such Filler location e.g. each such filler location, determine if there are any net segments in Metal-1 crossing the Filler space e.g. whether there is Metal-1 routing over the Filler.

If not (e.g. if no net segments in Metal-1 crossing the Filler space/no Metal-1 routing over the Filler), perform a Filler to Dcap swap e.g. the Filler (at least one such filler) is typically replaced with a same-size (to avoid generating an unresolved DRC) capacitor e.g. decap.

According to certain embodiments, timing analysis is performed on some most or all signals crossing Filler cells that may undergo re-routing, when a given Filler-Cell is replaced by a Dcap-Cell. Typically some most or all Signals/Nets in Metal-1 crossing Filler-Cells are checked. The check may for example include using any suitable TCL command to query the P&R tool. For example, the timing query may be performed in the Timing Analysis tool (e.g Synopsys PrimeTime) in which case the query may be written in TCL as: set slack [get_attribute $timing_path slack]

The Place-and-Route tool may then return a list including, for each signal checked, the name of the signals and the Filler Cell name and location, if any, that these signals respectively cross. This list may then be fed into a Timing-Analyzer Tool such as, for example, PrimeTime by Synopsys, to query the timing associated with each of these signals, using a suitable command such as "report_timing".

Performing operation 3 is typically a worthwhile effort because it is a "Low-hanging-fruit" type operation which yields Decap insertions with no adverse effect on routing and timing.

Operation 4. For at least one of e.g. each of the Filler locations which have Metal-1 routing over the Filler hence were not replaced in operation 3 above (typically the vast majority), record the timing condition of the nets that are routed in Metal-1 over the area occupied by the Filler cell e.g. record data returned responsive to timing query such as the "report_timing" TCL command.

Operation 5. Prioritize filler locations for upcoming swap operation. Any suitable prioritization may be predetermined such as but not limited to timing-driven prioritization e.g. prioritization by scanning of timing conditions recorded in operation 4, to sort all Filler locations by the timing slack of the nets routed in M1 over them e.g. sort the Nets whose timing condition was recorded in operation 4 (and consequently the Filler cells respectively associated with those nets) from top or highest priority ("best") timing condition to bottom or lowest priority ("worst") timing condition thereby to generate a sorted list.

Any suitable technology may be employed to check timing slack at a given location e.g. the following test:

```
foreach_in_collection timing_path [get_timing_path -through $net] {
  set slack [get_attribute $timing_path slack]
  if { $worst_slack > $slack } {
    set worst_slack $slack
  }
}
```

Typically, in operation 5, table iii created in operation 4 and storing all positive Slack signals crossings Filler Cells is sorted and unified to avoid erroneous subsequent generation of plural commands to swap the same Filler cell with a decap cell.

High-priority timing condition is typically defined as the filler cell having the most challenging Slack value e.g. having the smallest (yet at least Delta greater than zero) positive value since it is desired to prioritize swapping of these filler cells. Filler cells having numbers large and larger than Delta are progressively less and less challenging and swapping them is less and less of a priority and may not take place e.g. if a predetermined stopping criterion is reached before these "less challenging" filler cells have been swapped e.g. as described below.

Typically the priority of a filler cell crossed by plural nets is determined by the net having the most challenging e.g. smallest slack value.

Any net identified in operation 3 as having Metal-1 within a particular filler cell is deemed to be a net which is "associated" with that particular filler cell and such a filler cell is termed herein a filler which is "hosting" a metal-1 net.

According to certain embodiments, all signals/nets crossing all fillers, typically including but typically not limited to Metal-1 crossings, are checked (e.g. their timing is analyzed) and are marked "relevant" for route modification due to having positive slack or irrelevant if they do not have positive slack.

Typically, signals which are just barely above zero are not considered to have positive slack and instead, a positive-slack threshold or "slack-margin" or "delta" such as, say, +200 pS, is predefined and may be used to differentiate re-route candidates from signals whose slack is above zero yet below a threshold. Such below threshold signals are treated as negative-slack and the filler locations associated therewith are not candidates for re-routing. A fortiori, typically filler locations associated with slack that is even slightly negative are not candidates for replacement so as not to further aggravate locations which already fail to meet timing constraints.

Any suitable technology may be employed to check the timing slack at a certain filler location and determine whether the Slack query value is greater than the predetermined slack-margin e.g. the following test:

```
foreach_in_collection timing_path [get_timing_path -through $net] {
  set slack [get_attribute $timing_path slack]
  if { $worst_slack > $slack } {
    set worst_slack $slack
  }
}
```

Operation 6. Start replacing Fillers "hosting" Metal-1 nets with capacitors e.g. decaps, in any suitable order. For example the order may be determined by prioritizing by timing conditions (perhaps inter alia i.e. perhaps using a prioritization which combines timing considerations with other priority considerations) e.g. replacing in descending order of bestness of timing conditions, e.g. by swapping Fillers with capacitors e.g. decaps going down from the top of the list generated in operation 5.

It is appreciated that physical conversion of a Filler into a decap may be performed by any suitable conventional technology e.g. via a suitable TCL command in a suitable P&R tool command line such as;
change_link" a, t}' fillers_slack.report>! dcap.scr
change_link          xofiller!FILL16BWP7THVT!2544 DCAP16BWP7THVT Operation 7. Typically, terminate operation 6 when a predetermined stopping condition is found to have become true. For example, the stop condition could be any one of or any logical combination of:

Stop Condition A. Meeting a predefined design-mandated total capacitance (aka Instrinsic Capacitance value) of inserted capacitors e.g. decaps. This stop-condition is also termed the "DCAP requirement". To pre-determine a suitable predefined total, a transistor level simulation may be performed by a circuit designer or a dynamic-IR program.

The intrinsic capacitance value aka predefined total capacitance value aka predefined total dcap-value may be set by analog simulation of the circuit e.g. using a conventional power analysis program which may be run by the custom circuit team.

Typically, a total dcap value (aka total capacitance, instrinsic capacitance value) of capacitors e.g. Dcaps inserted thus far is computed at least once e.g. After running operations 0-6 above. Typically, the total decap-value is computed at the end of the Decap insertion. Then, assess if the Predefined total decap value has been met, after the most recent Filler→Decap swap. If the total decap value is still less than the predefined desired total, the design may be regressed to placement stage, to ensure the Intrinsic-cap requirement is fulfilled.

According to certain optional embodiments, the total dcap value is computed on occasion eg if swaps are performed using the list shown and described herein, top down, after each n swaps, the value may be computed, and if the current total value is still less than the decap requirement, n more swaps ae performed before re-computing and re-comparing to the predetermined decap requirement.

Stop Condition B. Reaching predefined criteria in timing conditions, e.g. avoid replacing Fillers if the timing of affected nets is worse than some predefined criteria e.g. less than (close to zero than) the predetermined slack-margin described herein. The predefined criteria may for example include a positive timing SLACK value aka slack-margin, that even if aggravated by the route change, still yields a positive SLACK on the modified net, such that no timing degradation occurs. This value may be used as a requirement or stop condition when the Filler to decap flow is run.

Alternatively or in addition to stopping operation 6 when a suitable stopping conditions becomes true, operation 6 may be interrupted or stopped responsive to a physical condition such as Metal-1 touching Metal-2, optionally even if an overall intrinsic cap value requirement is consequently not met. Or, for example, operation 6 may continue even given an undesirable physical condition such as Metal-1 touching Metal-2, until an overall intrinsic cap value requirement is met, after which operation 6 continues unless and until prevented when a physical condition such as Metal-1 touching Metal-2, occurs.

Another alternative is to continue operation 6 until all fillers whose nets have positive slacks, have been replaced by decaps.

According to certain embodiments, operation 6 may even be performed on a set of one or more nets with slightly (predeterminedly small) negative (e.g. below zero) slack.

Operation 8. The Implementation phase may be completed by suitable quality Control operations configured to ensure timing and DCR closure before design release to production. For example, all or some of the following quality Control operations of self-explanatory FIG. 2 may be performed:

Quality Control operation 8a. Timing of the subject logic is verified e.g. Via a timing query which may cross several logic structures.

Quality Control operation 8b. Any remaining timing violations are corrected. For example, even if a delta>0 slack-margin timing criterion is used, the timing of the corresponding net may get more timing propagation than expected, resulting in a timing violation which is then fixed (e.g. As per operation 8c below), until chip timing requirements have been met.

Quality Control operation 8c. Fix other Design-Rule (DRC) violations, if any, such as but not limited to transition margin violation, capacitance margin violations, using conventional implementation practices such as but not limited to buffering and/or std-cell resizing to meet timing degradations.

It is appreciated that suitable data tables such as some or all of tables I-iv described below, may be generated and used by the method shown and described herein.

For example, operation 2 may generate a table i storing Filler Cells and their corresponding location/coordinates. This table may be used to determine which locations are at least in theory available for placing capacitors e.g. decaps as described herein.

Operation 3 may generate a table ii storing query results for d any M1(aka metal1) layer net/s respectively crossing any of the queried filler cells (e.g. all filler cells or all filler cells stored in table i).

Operation 4 may generate a table iii storing Timing Slack values for all nets identified in operation 3/stored in table ii. It is appreciated that typically, a net crossing plural filler cells only undergoes timing slack value determination once.

Table iv may be generated in operation 6 and may comprise a table of commands that effect Filler Cell to Dcap cell swaps. Typically each command in table iv comprises a change link command that replaces a Filler with dcap if swap criteria are met e.g. if for a particular filler cell, all crossing signals are found (e.g. by accessing table iii), to have positive timing Slack, the associated Filler cell is set e.g. via a suitable addition to the table, to be replaced with a decap cell. Hence the actual Filler Cell to dcap cell swap (e.g. with "Timing-aware" Metal-1 signals) may be effected by running some or all commands stored in table iv e.g. as described herein. Typically, Table iv may for example comprise a list of commands including 2 columns indicating for a Place and Route Tool, which Filler is to be swapped to which Decap cell.

It is appreciated that the Operations 0-8 above (or any subset thereof) need not necessarily be applied to an entire chip. Alternatively, the method may be applied selectively, to save time and/or to save iterations and/or for any other reason, e.g. only to certain areas or regions of the chip e.g. only to highly congested areas (e.g. regions with high Metal-1 congestion) or only to high-criticality areas defined by a designer. such as areas whose logical function is defined by the designer as critical or only to any other subset of the entire area of the chip. For example, Filler to Decap swaps e.g. as per the method above may be performed only in congested areas of metal-1; metal-1 signals within Filler cells may be identified based on any suitable criteria.

Swapping all Filler cells in the chip without Metal-1 crossing as a separate operation may if desired in some use-cases be omitted; the same is true of other operations.

Looking at timing on Metal-1 net crossings of any given Filler cell, and addressing Timing/Timing-Critical Metal-1 net segments within the borders of each Filler cell provide considerable advantages.

As an alternative, the die may be scanned and any filter that is found with no m1 crossing can be swapped whereas Filler cells with Decap cells causing DRC violations in Metal-1 are not swapped. Instead, check if all the slacks of any/all crossing nets are greater than a predetermined delta and swap (filler to dcap) if so. Continue until the entire chip has been scanned or any other suitable time-based or other stopping criterion has occurred.

It is appreciated that more generally, the method of the present invention includes examination of timing on Metal-1 Filler cross nets, regardless of the particular die scanning approach employed (that of FIG. 1 or any other). for example the relevant table need not necessarily be ranked by timing conditions followed by swapping in descending order of timing conditions and instead, the order in which swaps occur (until a stopping criterion such as but limited to what is described herein) may be any suitable order e.g. by die regions, or row after row, or random order.

To give another example, in the method of FIG. 1, there may be a certain net metal-1 crossing which occurs within plural filler cell swap-candidates although statistically, having a net that crosses several filler cells in metal-1 is typically found to be a low or zero probability event. Checking timing for each of the filler cells typically includes a re-visit of the timing graph on the relevant signal-net that may have been checked before (for a previous filler cell crossed by that same net). However another alternative is that if a net is found whose slack is below delta, all filler cells which are crossed by that net are erased from the tables, because they are clearly not candidates to be swapped to a dcap. To facilitate this, the table ii might include a matrix with all filler cells along one dimension and all nets along the other dimension, and matrix-entries might be 1 to indicate a crossing of the relevant filler cell and net, whereas a matrix-entry of 0 at location x, y in the matrix may indicate no crossing between filler cell x and net y. Once certain filler cells are erased the method might not bother to check nets that cross only those erased cells.

It is appreciated that the method of FIG. 1 and its variants are advantageous inter alia because results are good in terms of Timing/DRC closure. Design elements characterized by close-timing are generally not disturbed by the DCAP insertion requirement, thereby minimizing timing-closure cycle prediction and/or because results are practical in terms of optimal capacitor e.g. decap insertion, implementing a good trade-off between IC timing, power integrity and physical implementation schedule. According to certain embodiments, e.g. in use cases for which timing is an overriding consideration, Filler to decap cell swaps which violate timing considerations are aborted and to overcome power integrity issues if any, chip/die enlargement may be considered or overall intrinsic capacitance requirements may be relaxed.

It is appreciated that the method of FIG. 1 and its variants is applicable in conjunction with, and suitably for enhancing or optimizing, any suitable decap insertion process such as but not limited to the processes described in the above-described Stringfellow-Pedicone document and other decap insertion processes described in the Background section.

Example

Dcap swapping Code written in terms of TCL commands suitable for running in the Synopsys-ICC Place and Route Tool is set out below, by way of example.

The code typically includes some or all of the following procedures which may be used together or stand-alone or in any suitable sub-combination and order:

a. ICC (Synopsys IC Compiler) Script
b. PT (PrimeTime) SCRIPT (typically code that runs in PT tool command-line comprises a set of TCL commands performing timing queries)
c. Generate change_link COMMANDS FOR ICC (this is a P&R tool command to perform reference cell swaps e.g. Filler to decap swaps.
d. PT SCRIPT to create a list of sensitive nets (e.g. having critical timing) e.g. based on a list of violating endpoints. Typically, the list of sensitive nets is derived from PT timing inquiries.
e. CSH (C-Shell Unix language which may drive certain queries e.g. by the Linux/Unix operating system) SCRIPT named 'look'
f. CSH SCRIPT to make sure no sensitive net is going to be harmed Typically, a Timing Delta-Slack is set to ensure critical/sensitive timing nets are not harmed, by refraining from replacing Filler cells associated with these nets with decap cells—thereby avoiding re-route that changes signal delay value.

ICC Script file delete fillers.report
foreach filler_type {FILL16BWP7THVT FILL32BWP7THVT -continued

```
FILL4BWP7THVT
FILL64BWP7THVT FILL8BWP7THVT GFILL10BWP7THVT
GFILL2BWP7THVT
GFILL3BWP7THVT GFILL4BWP7THVT GFILLBWP7THVT
FILL16BWP7T
FILL32BWP7T FILL4BWP7T FILL64BWP7T FILL8BWP7T
GFILL10BWP7T
GFILL2BWP7T GFILL3BWP7T GFILL4BWP7T GFILLBWP7 } {
  puts "processing fillers of type $filler_type"
  foreach_in_collection filler [get_cells -quiet -all * -filter "ref_name ==
$filler_type"] {
    set bbox [get_attribute $filler bbox]
    if { [array exists affected_nets] } {
      array unset affected_nets
    } else {
      set affected_nets .
      unset affected_nets
    }
    foreach_in_collection net_shape [get_net_shapes -quiet -touching
$bbox -filter "layer == M1"] {
      set affected_nets([get_attribute $net_shape owner_net]) 0
    }
    echo "[get_attribute $filler full_name] [array names
affected_nets]" >> fillers.report
  }
}
```

Result

```
xofiller!FILL16BWP7THVT!3497 core/ahb/icache_ahb/tpmi_icache_bist1k/n140
core/ahb/rom_if/n388 core/ahb/mme_top/mmu_core/mmu_mult/DW02_mult/n27291
xofiller!FILL16BWP7THVT!2546
xofiller!FILL16BWP7THVT!1224 core/ahb/mme_top/mmu_core/hdl_net_1756
{core/ahb/mme_top/mmu_core/arg_B_64bit[47] } core/ahb/mme_top/mmu_core/n269
xofiller!FILL16BWP7THVT!3496 core/ahb/aes_256b/aes_secure/aes_bikey_i/n389
xofiller!FILL16BWP7THVT!1939 {core/ahb/tpm_if/OWRx[0] }
{core/ahb/tpm_if/muxed_din[1] } core/ahb/tpm_if/n274
xofiller!FILL16BWP7THVT!2381 core/ahb/n479 core/host/spi2sib/n384
xofiller!FILL16BWP7THVT!2997
xofiller!FILL16BWP7THVT!2385
xofiller!FILL16BWP7THVT!3559 {core/ahb/ramc_ahb_if/ram_din_norm[11] }
xofiller!FILL16BWP7THVT!1228
:
:
```

Timing Analysis Metal-1 nets. This TCL code is run in PrimeTime—Timing analysis tool:

PT Script

```
file delete fillers_slack.report
set fi [open fillers.report r]
if { [array exists affected_nets] } {
  array unset affected_nets
} else {
  set affected_nets .
  unset affected_nets
}
while {[gets $fi line] >= 0} {
  regsub -all {[\{\}]} $line { } line
  regsub { .*$} $line { } instance_name
  regsub " $instance_name " $line { } nets
  if { "$nets" != "" } {
    foreach net $nets {
      set affected_nets($net) 1e9
    }
  }
}
close $fi
foreach net [array names affected_nets] {
  if { [get_attribute [get_nets $net] is_clock_network] == "true" } {
    set affected_nets($net) -9e9
  } else {
    set worst_slack 3e9
    foreach_in_collection timing_path [get_timing_path -through $net] {
      set slack [get_attribute $timing_path slack]
      if { $worst_slack > $slack } {
        set worst_slack $slack
      }
    }
    set affected_nets($net) $worst_slack
  }
}
set fi [open ../barak_big_shield/fillers.report r]
while {[gets $fi line] >= 0} {
  regsub -all {[\{\}]} $line { } line
  regsub { .*$} $line { } instance_name
  regsub " $instance_name " $line { } nets
  if { "$nets" == "" } {
    echo "$instance_name 4e9" >> fillers_slack.report
  } else {
    set worst_slack 5e9
    foreach net $nets {
      if { $worst_slack > $affected_nets($net) } {
        set worst_slack $affected_nets($net)
      }
    }
    echo "$instance_name $worst_slack" >> fillers_slack.report
  }
}
close $fi
```

Result

```
xofiller!FILL16BWP7THVT!1939  0.168931
xofiller!FILL16BWP7THVT!2381  3e9
xofiller!FILL16BWP7THVT!1313  0.422257
xofiller!FILL16BWP7THVT!1938  4.779100
xofiller!FILL16BWP7THVT!2380  0.154425
xofiller!FILL16BWP7THVT!1312  0.223101
xofiller!FILL16BWP7THVT!1367  4e9
xofiller!FILL16BWP7THVT!2995  0.038134
xofiller!FILL16BWP7THVT!2383  −0.111344
xofiller!FILL16BWP7THVT!2994  −9e9
xofiller!FILL16BWP7THVT!2382  −0.067261
xofiller!FILL16BWP7THVT!2997  8.272396
:
:
```

Generate change_link Commands for ICC

```
awk -F'!' '!/[012356789]e9/{t=$2; gsub(/FILL/,"DCAP",t);
  a=$0; gsub(/.*/," ",a); s=$NF; gsub(/.*/," ",s); if
  (s>0.21354) print "change_link" a, t}' fillers_slack.report> ! dcap.scr
```

Result

```
change_link xofiller!FILL16BWP7THVT!2544 DCAP16BWP7THVT
change_link xofiller!FILL16BWP7THVT!1226 DCAP16BWP7THVT
change_link xofiller!FILL32BWP7THVT!291 DCAP32BWP7THVT
change_link xofiller!FILL32BWP7THVT!293 DCAP32BWP7THVT
:
:
```

PT Script to Create a List of Sensitive Nets (Based on a List of Violating Endpoints)

```
file delete sensitive_nets
set fi [open 60_endpoints r]
while {[gets $fi endpoint] >= 0} {
  set counter 0
  foreach_in point [get_attr [get_timing_path -to $endpoint] points ] {
    if { [expr $counter % 2] == 1 } {
      echo "[get_attribute [get_nets -of [get_attr $point object]] full_name]" >> sensitive_nets
    }
    incr counter
  }
}
close $fi
```

Result

```
core/ahb/fiu/tsmc_if/fiu_tsmc_cor/fclk_cnt_2_
core/ahb/fiu/tsmc_if/fiu_tsmc_cor/n876
core/ahb/fiu/tsmc_if/fiu_tsmc_cor/n3043
core/ahb/fiu/tsmc_if/fiu_tsmc_cor/n1809
core/ahb/fiu/tsmc_if/fiu_tsmc_cor/hdl_net_ 1220
core/ahb/pka64_ram_envlp/bist_mem_wrap/WRAPPED_res_mem_B2/D_n[13]
core/ahb/pka64_ram_envlp/bist_mem_wrap/WRAPPED_res_mem_B2/n304
core/apb/cgc/cgc_regs/test_so3
core/apb/cgc/cgc_regs/n116
:
:
```

CSH Script Named 'look'

```
#!/bin/csh -fb
foreach net (`sed -e 's+\[+\\\[+g' -e 's+\]+\\\]+g' sensitive_nets.unique`)
  #echo "$net"
  grep -w "$net" fillers.report
end
```

CSH Script to Make Sure No Sensitive Net is Going to be Harmed

```
chmod a+x look
foreach filler (`look | awk '{print $1}' | sort -u | tr '!' '@'`)
  set num = `echo $filler | awk -F@ '{print $3 }'`
  set type = `echo $filler | awk -F@ '{print $2 }'`
  grep -w $num dcap.scr | grep -w $type
end
```

It is appreciated that the above TCL command language scripting of an embodiment of the DCAP swapping method shown and described herein is provided merely by way of example. Each command may be altered, performed in another order or omitted as suitable, depending on the use case, the design constraints, the particular p & r tool used, and so forth.

Advantages of certain embodiments include some or all of the following:

It is appreciated that the design process is typically constrained by product-specific requirements including requirements on the decaps that "must" be provided in the die. For example, "dcap values" (a parameter expressing the number of decaps" deemed necessary for the entire chip) may be set by:

a. Dynamic Current simulation (Dynamic IR analysis) generated e.g. by a conventional Power-Analysis Simulation program such as Apache/by-Ansys, Voltus/by-Cadene, PrimeRail/by-Synopsys.
   identifies voltage drops that might affect proper operation of any of the standard cells (aka std-cells) in the design and sets a DCAP value that will address degradation in regular operation to alleviate identified voltage drop/s.

Dynamic/Static IR drop simulation may be conducted including identifying any drops below/above the "voltage tolerance" value, and for each such drop, a dcap cell may be deemed necessary to provide/absorb the voltage swing, and provide the charge that will guarantee proper functionality of the standard cell.

And/or b. Transistor-level simulation programs such as (Spice, PrimeRail, Apache) compute an average Dynamic-IR drop and sets a DCAP value that will address degradation in regular operation as to alleviate identified Dynamic-IR drop/s.

A particular advantage of certain embodiments, is that a smaller chip and/or chip with higher cell utilization results and/or more congested routing resources may be employed, and nonetheless, requirements such as the above may be met.

Advantages yielded by certain embodiments include the ability to achieve a DCAP embedment that is deemed necessary (e.g. a pre-specificed "dcap values" level, meeting circuit simulation requirements without compromising die-area (without enlargement of the die) and without creating high routing congestions.

Operation of a Standard cell is characterized by certain voltage levels aka nominal characterized values. When the std-cell experiences a voltage drop or gain larger than the nominal characterized value, behavior timing analysis becomes inaccurate, which may result in chip failure. For example, std-cell normal operation is typically characterized at 1.2V and silicon vendors typically characterize std-cell operations at +/−10% of the nominal value in which case viable timing performance is predicted even if the actual voltage drop is within the [1.08V, 1.32V] range aka "voltage tolerance", whereas values outside the voltage tolerance typically sets a DCAP cap value that provides a local charge to the std-cell which assures that std-cell will remain in the characterized region thereby to ensure the std-cell operates in the voltage swing as designed.

It is appreciated that any terminology used herein which is specific to the ICC P & R TOOL is used merely by way of example and alternatively, other place and route tools may be used, mutatis mutandis.

It is appreciated that terminology such as "mandatory", "required", "need" and "must" refer to implementation choices made within the context of a particular implementation or application described herewithin for clarity and are not intended to be limiting since in an alternative implementation, the same elements might be defined as not mandatory and not required or might even be eliminated altogether.

Each module or component or processor may be centralized in a single physical location or physical device or distributed over several physical locations or physical devices.

Included in the scope of the present disclosure, inter alia, are electromagnetic signals in accordance with the description herein. These may carry computer-readable instructions for performing any or all of the operations of any of the methods shown and described herein, in any suitable order, including simultaneous performance of suitable groups of operations as appropriate; machine-readable instructions for performing any or all of the operations of any of the methods shown and described herein, in any suitable order; program storage devices readable by machine, tangibly embodying a program of instructions executable by the machine to perform any or all of the operations of any of the methods shown and described herein, in any suitable order i.e. not necessarily as shown, including performing various operations in parallel or concurrently rather than sequentially as shown; a computer program product comprising a computer useable medium having computer readable program code, such as executable code, having embodied therein, and/or including computer readable program code for performing, any or all of the operations of any of the methods shown and described herein, in any suitable order; any technical effects brought about by any or all of the operations of any of the methods shown and described herein, when performed in any suitable order; any suitable apparatus or device or combination of such, programmed to perform, alone or in combination, any or all of the operations of any of the methods shown and described herein, in any suitable order; electronic devices each including at least one processor and/or cooperating input device and/or output device and operative to perform e.g. in software any operations shown and described herein; information storage devices or physical records, such as disks or hard drives, causing at least one computer or other device to be configured so as to carry out any or all of the operations of any of the methods shown and described herein, in any suitable order; at least one program pre-stored e.g. in memory or on an information network such as the Internet, before or after being downloaded, which embodies any or all of the operations of any of the methods shown and described herein, in any suitable order, and the method of uploading or downloading such, and a system including server/s and/or client/s for using such; at least one processor configured to perform any combination of the described operations or to execute any combination of the described modules; and hardware which performs any or all of the operations of any of the methods shown and described herein, in any suitable order, either alone or in conjunction with software. Any computer-readable or machine-readable media described herein is intended to include non-transitory computer- or machine-readable media.

Features of the present invention, including operations, which are described in the context of separate embodiments may also be provided in combination in a single embodiment. For example, a system embodiment is intended to include a corresponding process embodiment and vice versa.

Conversely, features of the invention, including operations, which are described for brevity in the context of a single embodiment or in a certain order may be provided separately or in any suitable subcombination, including with features known in the art (particularly although not limited to those described in the Background section or in publications mentioned therein) or in a different order. "e.g." is used herein in the sense of a specific example which is not intended to be limiting. Each method may comprise some or all of the operations illustrated or described, suitably ordered e.g. as illustrated or described herein.

The invention claimed is:

1. A method for designing an integrated circuit die, the method including:
   generating a first layout for the die which includes at least one decap cell; and
   performing a post-processing decap insertion operation to add to said layout at least one additional decap cell in excess of said at least one decap cell, the operation including:
   for at least a portion of said first layout which comprises locations of dcap cells having net crossings with positive slack, identifying at least some of said net crossings at the locations in said at least said portion which have positive slack, as "candidate" locations; and
   inserting at least one additional decap cell at this one location respectively, from among said "candidate" location,
   thereby to increase the intrinsic-cap value of decap cells, in said layout, and consequently in integrated circuits produced according to said layout,
   wherein said post-processing decap insertion operation ensures critical/sensitive timing nets are not harmed so as to avoid re-routing that changes signal delay value, by refraining from replacing filler cells, which are associated with said crossings with critical/sensitive timing nets, with decap cells.

2. The method according to claim 1 wherein timing requirements are defined for the die and wherein the first layout for the die meets all of said timing requirements.

3. The method according to claim 1 wherein said at least a portion comprises the entire first layout.

4. The method according to claim 1 wherein within at least a portion of the die, said inserting at least one additional decap cell occurs repeatedly, in descending order of slack.

5. The method according to claim 4 wherein within the entire die, said inserting occurs repeatedly, in descending order of slack.

6. The method according to claim 1 wherein the first layout includes a set of filler locations including at least one filler location and wherein at least some filler locations in said set have METAL-1 signal crossing signal or clock nets, and wherein said identifying comprises identifying at least some of said filler locations in said set which have METAL-1 signal crosses.

7. The method according to claim 6 wherein said identifying comprises identifying, for at least said portion of said first layout for the die, only filler locations in at least said portion which have Metal-1 signal nets' crosses with positive timing slack, as "candidate" locations; and replacing at least one of said "candidate" locations with at least one decap respectively.

8. The method according to claim 1 wherein said portion comprises a set of filter locations and wherein all filler locations in said set whose nets have positive slack, are identified as "candidate" locations.

9. The method according to claim 1 wherein a capacitance value is defined for each of said decap cells, and wherein, within at least a portion of the die, said inserting occurs repeatedly until a stop-criterion is reached, the stop-criterion comprising: a sum of said capacitance values, over all dcaps inserted in said inserting, has reached a predetermined total capacitance.

10. The method according to claim 1 wherein the first layout includes a set of filler locations including at least one filler location and wherein for at least one filler location F in said set the method determines whether or not there is a metal-1 routing over the filler location F, the method also comprising a replacing operation, in which at least one filler location F', in which the method has determined that there is no metal-1 routing over the filler location F', is replaced by a decap.

11. The method according to claim 10 wherein all filler locations in said set are checked to determine whether or not there is metal-1 routing over each of the filler locations in said set.

12. The method according to claim 10 wherein a necessary condition for performing said replacing operation at an individual filler location is that there is no metal-1 routing over the individual filler location.

13. The method according to claim 1 wherein the die includes Metal-1 net segments with positive timing slack, the method also comprising:
   identifying said Metal-1 net segments with positive timing,
   forcing at least one Filler to Decap swap that causes a DRC/Net Short and
   re-routing at least one Metal-1 net that is shorting to alleviate the signal shorts in a metal scheme higher than metal-1.

14. The method according to claim 1 wherein the first layout includes a set of filler locations including at least one filler location and wherein some of the set's filler location/s have nets crossings with positive slack and wherein said identifying comprises identifying at least some of said filler location/s which have nets with positive slack, as "candidate" locations.

15. The method according to claim 1 wherein a final optimization of dcap cell placement, including identifying available free areas and populating them with capacitors, takes place after closure of timing.

16. The method according to claim 15 wherein at least one Filler to decap cell swap which violates timing considerations is/are aborted.

17. The method according to claim 16 wherein all Filler to decap cell swaps which violate timing considerations are aborted.

18. The method according to claim 1 and also comprising recording, for at least one Filler location which has Metal-1 routing over the Filler, the timing condition of the nets that are routed in Metal-1 over the area occupied by the Filler cell and prioritizing filler locations for upcoming swap of these filler cells for decap cells, where High-priority timing condition comprises the filler cell having the smallest, yet at least Delta greater than zero, positive slack value and wherein swapping of a second filler cell does not take place if a predetermined stopping criterion is reached after a first filler cell with a positive slack value v_small has been swapped but before the second filler cell with a slack value v_2>v_small has been swapped.

19. The method according to claim 1 wherein Metal-1 crossings are checked including analyzing their timing and are marked "relevant" for route modification due to having positive slack or irrelevant if they do not have positive slack.

20. The method according to claim 1 wherein said locations comprise filler spaces.

21. The method according to claim 1 and also comprising producing at least one integrated circuit according to said layout.

22. A system for designing an integrated circuit die, the system including:
   at least one processor configured for generating a first layout for the die which includes at least one decap cell; and
   performing a post-processing decap insertion operation to add to said layout at least one additional decap cell in excess of said at least one decap cell, the operation including:
      for at least a portion of said first layout which comprises locations of dcap cells having net crossings with positive slack, identifying at least some of said net crossings at the locations in said at least said portion which have positive slack, as "candidate" locations; and
      inserting at least one additional decap cell at this one location respectively, from among said "candidate" location,
   thereby to increase the intrinsic-cap value of decap cells, in said layout, and consequently in integrated circuits produced according to said layout,
   wherein said post-processing decap insertion operation ensures critical/sensitive timing nets are not harmed so as to avoid re-routing that changes signal delay value, by refraining from replacing filler cells, which are associated with said crossings with critical/sensitive timing nets, with decap cells.

23. A computer program product, comprising a non-transitory tangible computer readable medium having computer readable program code embodied therein, said computer readable program code adapted to be executed to implement a method designing an integrated circuit die, the method including:
   generating a first layout for the die which includes at least one decap cell; and
   performing a post-processing decap insertion operation to add to said layout at least one additional decap cell in excess of said at least one decap cell, the operation including:
      for at least a portion of said first layout which comprises locations of dcap cells having net crossings with positive slack, identifying at least some of said net crossings at the locations in said at least said portion which have positive slack, as "candidate" locations; and
      inserting at least one additional decap cell at this one location respectively, from among said "candidate" location,
   thereby to increase the intrinsic-cap value of decap cells, in said layout, and consequently in integrated circuits produced according to said layout,
   wherein said post-processing decap insertion operation ensures critical/sensitive timing nets are not harmed so as to avoid re-routing that changes signal delay value, by refraining from replacing filler cells, which are associated with said crossings with critical/sensitive timing nets, with decap cells.

* * * * *